(12) United States Patent  (10) Patent No.: US 7,712,924 B2
Ma  (45) Date of Patent: May 11, 2010

(54) OPTICAL DEVICE FOR ADJUSTING THE F-NUMBER OF AN ELLIPTICAL LAMP

(75) Inventor: Joseph Ma, Waterloo (CA)

(73) Assignee: Christie Digital Systems USA, Inc., Cypress, CA (US)

( * ) Notice: Subject to any disclaimer, the term of this patent is extended or adjusted under 35 U.S.C. 154(b) by 168 days.

(21) Appl. No.: 12/003,492

(22) Filed: Dec. 26, 2007

(65) Prior Publication Data

US 2009/0168426 A1 Jul. 2, 2009

(51) Int. Cl.
*F21V 19/02* (2006.01)
(52) U.S. Cl. ............... 362/285; 362/302; 362/304; 362/305; 362/217.06
(58) Field of Classification Search ............ 362/302, 362/304, 305, 285, 217.06, 296.08, 311.07, 362/187, 311.08
See application file for complete search history.

(56) References Cited

U.S. PATENT DOCUMENTS

| | | | |
|---|---|---|---|
| 5,586,015 | A | 12/1996 | Baldwin et al. |
| 5,769,844 | A | 6/1998 | Ghaffari |
| 6,200,005 | B1 | 3/2001 | Roberts et al. |
| 6,231,193 | B1 * | 5/2001 | Sugawara ............... 353/102 |
| 6,625,381 | B2 | 9/2003 | Roddy et al. |
| 6,639,652 | B1 | 10/2003 | Mori et al. |
| 7,252,393 | B1 | 8/2007 | Ma et al. |
| 2004/0090763 | A1 * | 5/2004 | Li et al. ................. 362/19 |
| 2005/0052873 | A1 * | 3/2005 | Sokolov ................ 362/341 |
| 2005/0174658 | A1 | 8/2005 | Long et al. |
| 2006/0285087 | A1 | 12/2006 | Huang |
| 2006/0285807 | A1 | 12/2006 | Lu et al. |

FOREIGN PATENT DOCUMENTS

| | | |
|---|---|---|
| EP | 0 629 813 A1 | 6/1994 |
| EP | 1 306 697 A1 | 6/1995 |

(Continued)

OTHER PUBLICATIONS

U.S. Appl. No. 60/500,688, filed Sep. 8, 2003, Sokolov.

(Continued)

*Primary Examiner*—Sandra L O'Shea
*Assistant Examiner*—Evan Dzierzynski
(74) *Attorney, Agent, or Firm*—Staas & Halsey LLP

(57) ABSTRACT

An optical device for effectively adjusting the F-number of an elliptical lamp is provided, the elliptical lamp for producing a focused light beam at a given focal point having a given cone angle. The optical device comprises a light interaction portion for optically interacting with the focused light beam when the light interaction portion is in general longitudinal alignment with a light emitting aperture of the elliptical lamp, the light interaction portion for triggering optical adjustment of a cone angle of at least a high cone angle portion of the focused light beam to a smaller cone angle. The optical device further comprises a light egress portion, coupled to the light interaction portion, for enabling exit of the focused light beam from the optical device with an effective cone angle smaller than the given cone angle, after the cone angle of the at least the high cone angle portion of the focused light beam has been adjusted to the smaller cone angle.

21 Claims, 12 Drawing Sheets

FOREIGN PATENT DOCUMENTS

| | | |
|---|---|---|
| EP | 1617284 | 1/2006 |
| EP | 1 667 469 | 6/2006 |
| GB | 229039 | 2/1925 |
| GB | 2 378 499 | 2/2003 |
| JP | 2005-85768 | 3/2005 |
| WO | 99/64784 | 12/1999 |

OTHER PUBLICATIONS

European Search Report issued on Nov. 10, 2008 in corresponding European Patent Application 08252211.1.

European Search Report mailed Apr. 14, 2009 and issued in corresponding European Patent Application 08254139.2.

European Search Report issued Dec. 11, 2009 in corresponding European Application No. 09 25 1995.

* cited by examiner

US 7,712,924 B2

OPTICAL DEVICE FOR ADJUSTING THE F-NUMBER OF AN ELLIPTICAL LAMP

FIELD

The specification relates generally to optical systems, and specifically to an optical device for adjusting the F-number of an elliptical lamp.

BACKGROUND

In a projector, for example a digital projector, there are two main optical paths—illumination and projection paths. The illumination path generally comprises a light source such as an elliptical lamp (e.g. an elliptical Hg lamp), an integrator for generating a more uniform beam of light from the light source (i.e. an integrator rod), and illumination relay optics for conveying light from the integrator to the projection path (including the image generation light modulators, such as a digital multi-mirror device (DMD)). The elliptical lamp generally consists of a light source, such as a burner arc, and an elliptical reflector.

However, there is a general problem of mismatch in F-number between the elliptical lamp, the illumination relay optics and the light modulator apparatus. For example, the F-number of commercially available elliptical lamps is generally 0.8 to 1.0, and the F-number of commercially available light modulators is generally about 2.5 (e.g. in a 3-chip projector). Regardless of the F-number chosen for the illumination relay optics, then, light will be lost as it travels from the elliptical lamp to the integrator, and through the illumination relay optics to the light modulator due to the loss in high cone angle light from the low F-number elliptical lamp as it tries to enter the high F-number light modulator.

One approach to this problem has been to match the input F-number of the illumination relay optics to the elliptical lamp, and provide the illumination relay optics with a magnification factor of 2.5/0.8=3.125, such that the output F-number matches the F-number of the light modulator. However, such a large magnification factor requires that the cross section of the integrator be very small, and hence lowers the light collection efficiency of the system due to the overfilling of the large focal spot from the elliptical lamp on the integrator. A partial solution to the problem may be to increase the input F-number of the illumination relay optics such that a larger illumination rod can be used. For example, if the input F-number is 1.3 and the output F-number is 2.5, the magnification factor of the illumination relay optics will be only 1.923 instead of 3.125, as above. However, the F-number of the elliptical lamp remains small, light with high incident angle will be lost due to the F-number mismatch at the input face of the integrator, again reducing the overall light collection efficiency of the system.

SUMMARY

A first broad aspect of an embodiment seeks to provide a reflective iris for adjusting the F-number of an elliptical lamp, the elliptical lamp for producing a focused light beam at a given focal point having a given cone angle. The reflective iris comprises a generally spherical convex mirror portion for retro-reflecting a high cone angle portion of the focused light beam back through the elliptical lamp, when the generally spherical convex mirror portion is in general longitudinal alignment with a light emitting aperture of the elliptical lamp and a center of the generally spherical convex mirror portion is generally aligned with the given focal point, such that the high cone angle portion emerges from the elliptical lamp at a smaller cone angle after retroflection. The reflective iris further comprises an optical aperture through the generally spherical convex mirror portion, disposed around a longitudinal axis of the generally spherical convex mirror portion, for enabling transmission there-through of a lower cone angle portion of the focused light beam and the retro-reflected high cone angle portion, such that an effective cone angle of the elliptical lamp is smaller than the given cone angle.

In some embodiments of the first broad aspect, the effective cone angle comprises the lower cone angle.

In other embodiments of the first broad aspect, an area of the optical aperture is generally circular.

In further embodiments of the first broad aspect, the reflective iris further comprises an adjustable aperture apparatus for adjusting an area of the optical aperture. In some of these embodiments, the adjustable aperture apparatus comprises an iris diaphragm.

In yet further embodiments of the first broad aspect, the reflective iris further comprises an ultraviolet filter for preventing ultraviolet light from passing through the optical aperture.

In some embodiments of the first broad aspect, the shape of the generally spherical convex mirror portion is generally circular, having a diameter that enables interaction of the generally spherical convex mirror portion with the highest angle light ray of the high cone angle portion of the focused light beam.

In other embodiments of the first broad aspect, the reflective iris further comprises a body, the body comprising at least one spherical surface, wherein the generally spherical convex mirror portion resides at the at least one planar surface.

In further embodiments of the first broad aspect, the body further comprises a bore through the longitudinal axis, the optical aperture comprising the bore. In some of these embodiments, the body comprises a reflective metal. In other embodiments, the reflective iris, further comprises a reflective film applied to the at least one spherical surface, and the generally spherical convex mirror portion comprises the reflective film. In further embodiments, the body comprises a generally transparent material, the generally spherical convex mirror portion comprising a reflective film applied to a first area of the at least one spherical surface, and the reflecting film surrounding a second area of the at least one spherical surface free of the reflecting film, and the optical aperture comprising the second area. In some of these embodiments, the reflective film compress at least one of a reflective metal film and an optical thin film structure. In further embodiments, the generally transparent material comprises a high temperature glass. In some embodiments, the high temperature glass comprises at least one of Vycor™ and Pyrex™.

In some embodiments, the body is at least one of mountable between the elliptical lamp and a lens, and mountable on the elliptical lamp.

A second broad aspect of an embodiment seeks to provide an optical device for effectively adjusting the F-number of an elliptical lamp, the elliptical lamp for producing a focused light beam at a given focal point having a given cone angle. The optical device comprises a light interaction portion for optically interacting with the focused light beam when the light interaction portion is in general longitudinal alignment with a light emitting aperture of the elliptical lamp, the light interaction portion for triggering optical adjustment of a cone angle of at least a high cone angle portion of the focused light beam to a smaller cone angle. The optical device further comprises a light egress portion, coupled to the light interaction portion, for enabling exit of the focused light beam from the optical device with an effective cone angle smaller than the given cone angle, after the cone angle of the at least the high cone angle portion of the focused light beam has been adjusted to the smaller cone angle.

In some embodiments of the second broad aspect, the optical device further comprises a reflective iris, the light interaction portion comprising a generally spherical convex mirror portion of the reflective iris for retro-reflecting the high cone angle portion of the focused light beam back through the elliptical lamp, when the generally spherical convex mirror portion is in general longitudinal alignment with a light emitting aperture of the elliptical lamp and a center of the generally spherical convex mirror portion is generally aligned with the given focal point, such that the high cone angle portion emerges from the elliptical lamp at the smaller cone angle after retroflection; and the light egress portion comprises an optical aperture of the reflective iris through the generally spherical convex mirror portion, disposed around a longitudinal axis of the generally spherical convex mirror portion, for enabling transmission there-through of a lower cone angle portion of the focused light beam and the retro-reflected high cone angle portion, such that an effective cone angle of the elliptical lamp is smaller than the given cone angle.

In other embodiments of the second broad aspect, the optical device further comprises a meniscus lens, the light interaction portion comprising a lamp side surface of the meniscus lens, having a first radius of curvature, and the light egress portion comprising an integrator side surface of the meniscus lens, having a second radius of curvature smaller than the first radius of curvature, such that when the focused light beam enters the lamp side surface and exits the integrator side surface, the focused light beam is converged to a cone angle smaller than the given cone angle.

A third broad aspect of an embodiment seeks to provide a light production system comprising: an elliptical lamp for producing a focused light beam, the elliptical lamp having a first F-number; and means for effectively adjusting the first F-number of the elliptical lamp to a second F-number, the means for effectively adjusting the first F-number of the elliptical lamp to a second F-number positioned in front of a light emitting aperture of the elliptical lamp.

In some embodiments of the third broad aspect, the means for effectively adjusting the first F-number of the elliptical lamp to a second F-number comprises an optical device in longitudinal alignment with the light emitting aperture, the optical device for adjusting the first F-number of the elliptical lamp and comprising: a light interaction portion for optically interacting with the focused light beam, the light interaction portion for triggering optical adjustment of a cone angle of at least a high cone angle portion of the focused light beam to a smaller cone angle; and a light egress portion, coupled to the light interaction portion, for enabling exit of the focused light beam from the optical device with an effective cone angle smaller than the given cone angle, after the cone angle of the at least the high cone angle portion of the focused light beam has been adjusted to the smaller cone angle, such that an effective F-number of the elliptical lamp comprises the second F-number, the second F-number smaller than the first F-number.

In some of these embodiments, the optical device comprises a reflective iris, the light interaction portion comprising a generally spherical convex mirror portion of the reflective iris for retro-reflecting the high cone angle portion of the focused light beam back through the elliptical lamp, when the generally spherical convex mirror portion is in general longitudinal alignment with the light emitting aperture and a center of the generally spherical convex mirror portion is generally aligned with the given focal point, such that the high cone angle portion emerges from the elliptical lamp at the smaller cone angle after retroflection; and the light egress portion comprising an optical aperture of the reflective iris through the generally spherical convex mirror portion, disposed around a longitudinal axis of the generally spherical convex mirror portion, for enabling transmission there-through of a lower cone angle portion of the focused light beam and the retro-reflected high cone angle portion, such that an effective cone angle of the elliptical lamp is smaller than the given cone angle.

In other embodiments, the optical device comprises a meniscus lens, wherein the light interaction portion comprises a lamp side surface of a meniscus lens, having a first radius of curvature, and the light egress portion comprises an integrator side surface of the meniscus lens, having a second radius of curvature smaller than the first radius of curvature, such that when the focused light beam enters the lamp side surface and exits the integrator side surface, the focused light beam is converged to a cone angle smaller than the given cone angle.

In further embodiments of the third broad aspect, the light production system is a component of a projector, the projector further comprising: an integrator, an entrance of the integrator generally located at, at least one of a center of the means for effectively adjusting the first F-number of the elliptical lamp to a second F-number and a focal point of the means for effectively adjusting the first F-number of the elliptical lamp to a second F-number; an imaging component for accepting light from the integrator and causing the light from the integrator to be formed into an image, the integrator arranged to channel light to the imaging component; and at least one projection component for accepting the image from the imaging component and projecting the image.

BRIEF DESCRIPTIONS OF THE DRAWINGS

Embodiments are described with reference to the following figures, in which.

DETAILED DESCRIPTION OF THE EMBODIMENTS

Figure 1:
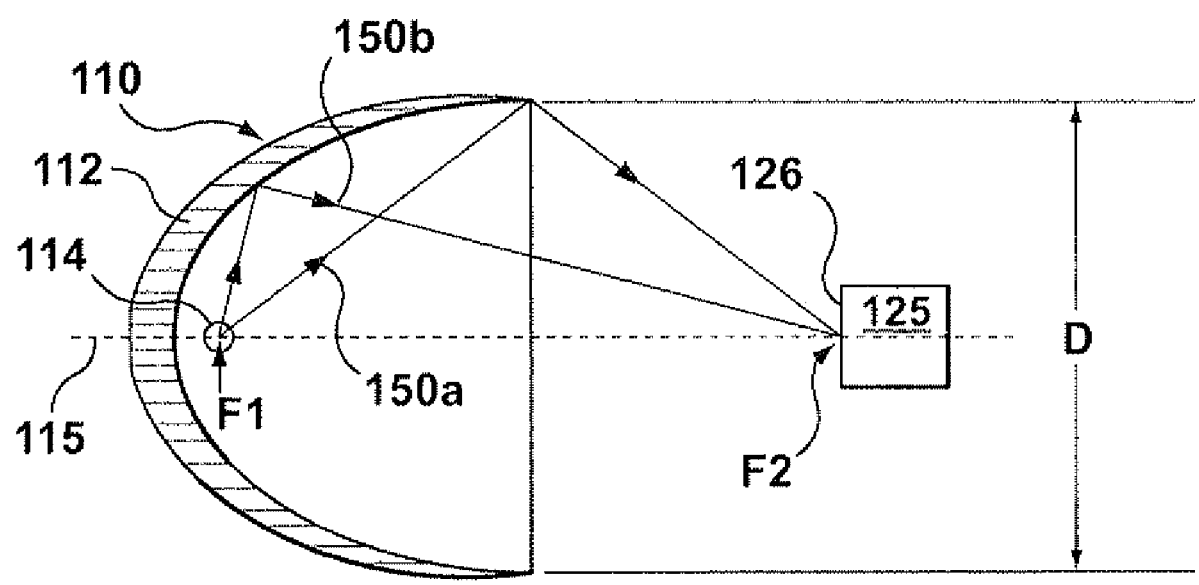
FIG. 1 depicts an optical system for focusing light from an elliptical lamp onto an entrance of an integrator, according to the prior art.

To gain an understanding of embodiments described hereafter, it is useful to first consider FIG. 1, which depicts a system for focusing the light from an elliptical lamp 110 onto an entrance 126 of an integrator 125, according to the prior art. The elliptical lamp 110 and the integrator 125, are axially aligned along a longitudinal axis 115 of the elliptical lamp 110. The elliptical lamp 110 is depicted in cross-section, and is generally symmetrical about the longitudinal axis 115. The integrator 125 is depicted schematically. As known to one of skill in the art, in a projector, the integrator 125 collects the light which impinges on an entrance 126, and channels it to another optical component, for example illumination relay optics (not depicted) and ultimately a light modulator (not depicted), while simultaneously scattering the light internally to create a more uniform beam of light.

The elliptical lamp 110 comprises an elliptical reflector 112, having an aperture of diameter D, and a light source 114. The light source 114 is generally located at a first focal point F1 of the elliptical reflector 114 on the longitudinal axis 115. In some embodiments, the elliptical lamp 110 comprises an elliptical Hg lamp, and hence the light source 114 may comprise a burner arc. However, other types of elliptical lamps are within the scope of present embodiments. As known to one of skill in the art, light rays emitted from the from light source 114, for example lights rays 150a and 150b (collectively light rays 150 and generically light ray 150), that are reflected from the elliptical reflector 112, are focused at a second focal point F2 of the elliptical reflector 112. Hence, the entrance 126 of the integrator 125 is generally located at F2, while the light source 114 is modeled as a point source in FIG. 2, and subsequent figures, the light source 114 is generally an areal light source and hence overfilling of a large focal spot occurs at the entrance 126 (i.e. an image of the areal light source occurs at the entrance 126).

Figure 5:
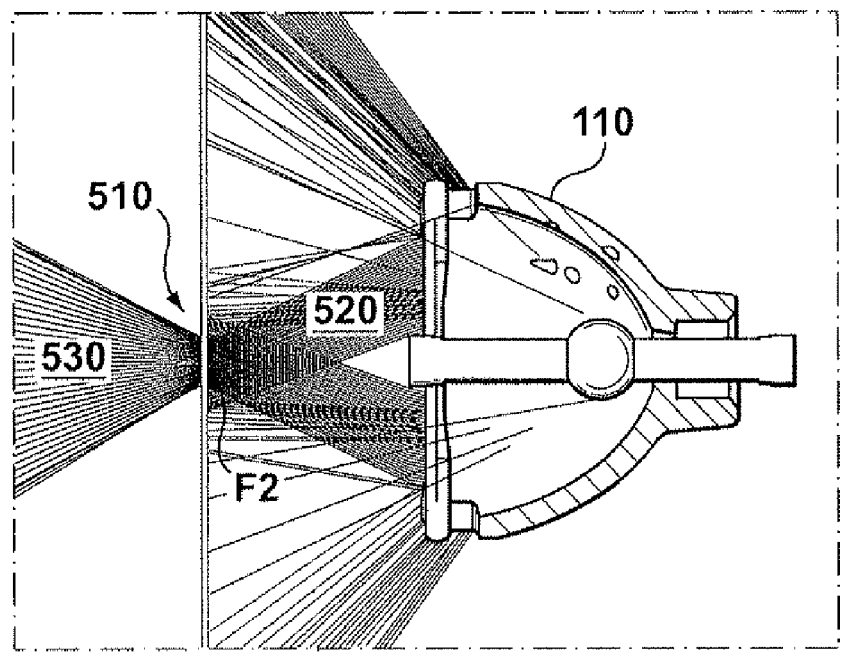
FIG. 5 depicts a ray trace diagram of light emitted from an elliptical lamp in alignment with a rectangular aperture, according to a non-limiting embodiment.
Figure 6:
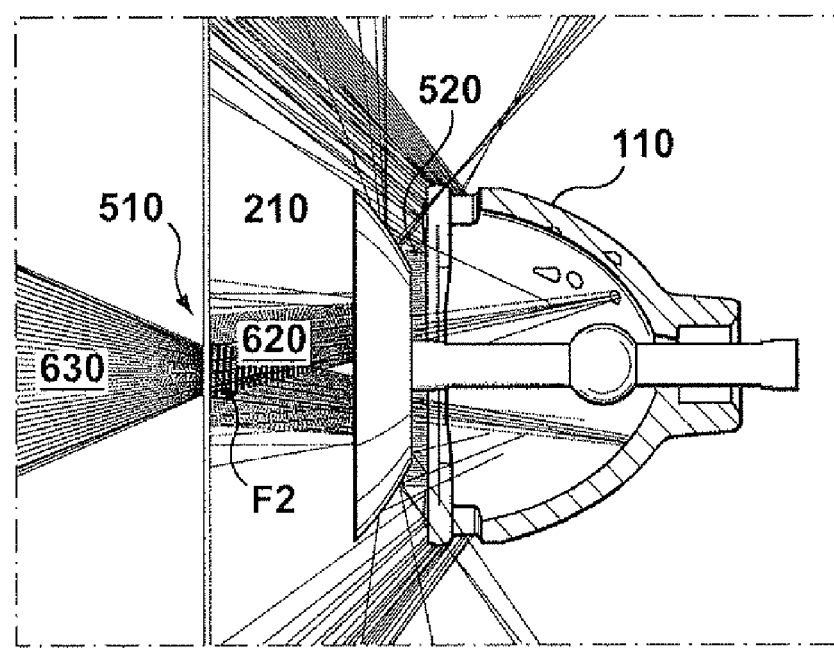
FIG. 6 depicts a ray trace diagram of light emitted from a reflective iris in alignment with an elliptical lamp and a rectangular aperture, according to a non-limiting embodiment.

A person of skill in the art would understand that the light source 114 is generally emitting light in all directions (with the exception of those parts of the light source that comprise the electrical connecting portions of the light source 114 etc., which block portions of the light source 114). A person of skill in the art would further understand that the light ray 150a is emerging from the elliptical lamp 110 at a high cone angle, and that the light ray 150a generally defines a high angle cone which is emerging from the elliptical lamp 110 generally symmetric about the longitudinal axis 115 (as depicted in FIGS. 5 and 6). Similarly, a person of skill in the art would further understand that the light ray 150b is emerging from the elliptical lamp 110 at a low cone angle.

The F-number of the elliptical lamp 110 is defined by the ratio of the focal length F2 to the aperture diameter D, or F2/D, and generally defines the cone angle of the highest angle cone emerging from the elliptical lamp 110, in this example the cone defined by the light ray 150a. It is this high cone angle light that is particularly difficult to capture by the integrator 125, the illumination relay optics and/or the light modulator. Indeed, the high cone angle light has a tendency to scatter outside the receiving optics of the illumination relay optics and/or the light modulator, reducing the overall light collection efficiency of the system, especially if there is a mismatch between the F-number of the elliptical lamp 110 and the illumination relay optics (and/or the light modulator), the F-number of the illumination-relay optics being generally larger than the F-number of the elliptical lamp 110. The overfilling of the large focal spot on the entrance 126 further serves to decrease the light collection efficiency of the system.

Figure 2:
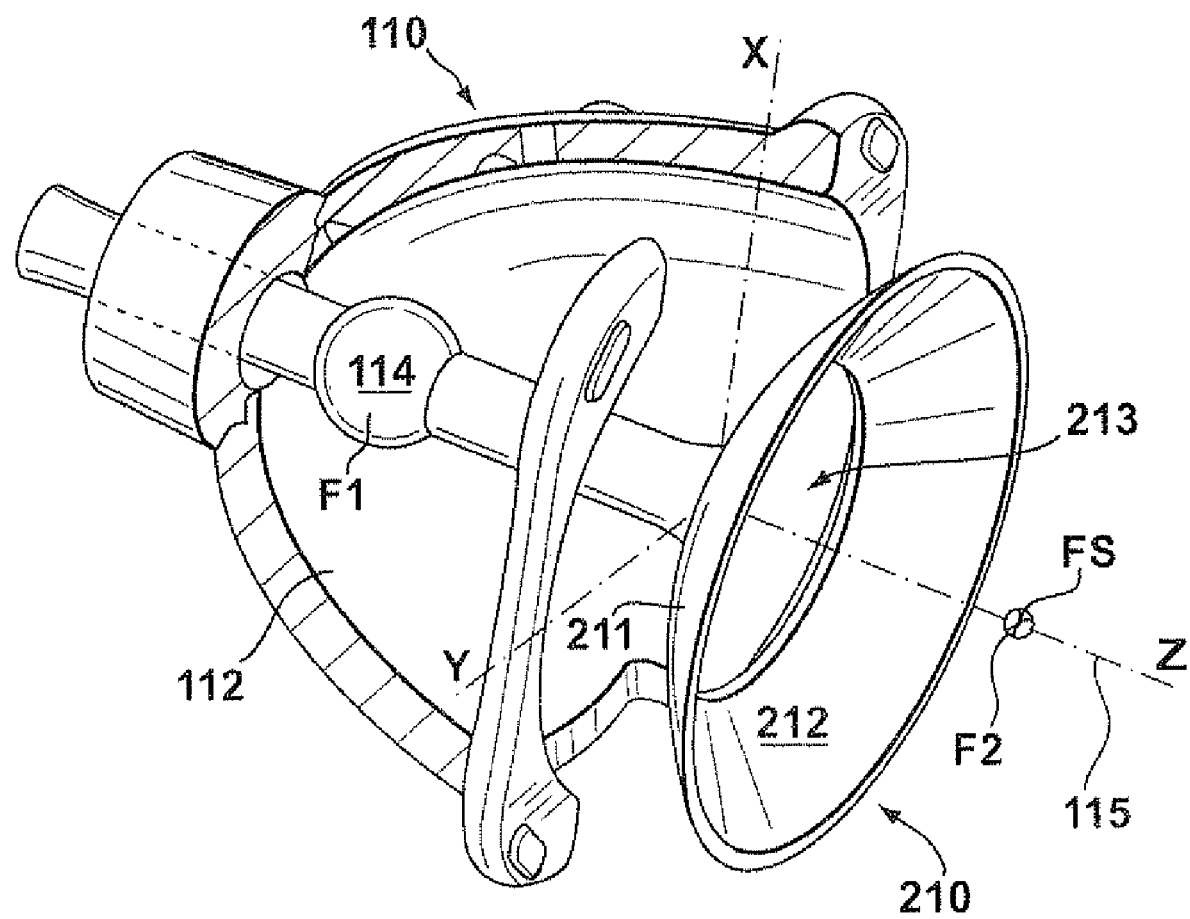
FIG. 2 depicts a perspective view of a reflective iris in alignment with an elliptical lamp, according to a non-limiting embodiment.
Figure 4:
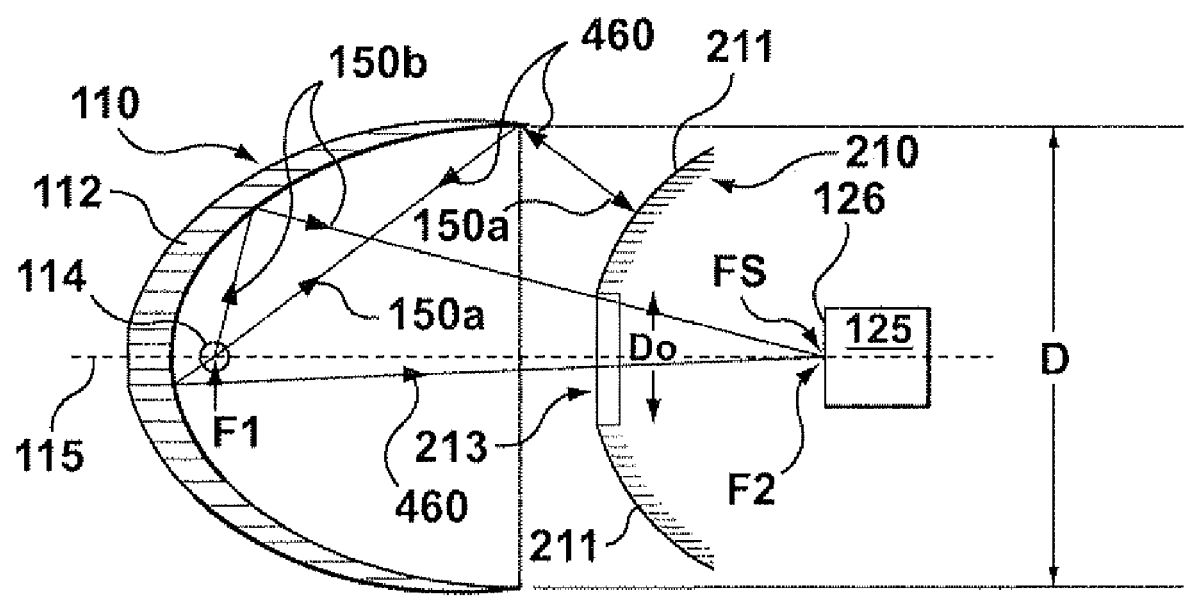
FIG. 4 depicts a cross-section of a reflective iris in alignment with an elliptical lamp, according to a non-limiting embodiment.

Attention is now directed to FIG. 2, which depicts an embodiment of an optical device for adjusting the f-number of an elliptical lamp. Specifically, FIG. 2 depicts a perspective view of a reflective iris 210 for effectively adjusting the F-number of an elliptical lamp, for example the elliptical lamp 110, according to a non-limiting embodiment. In FIG. 2, the elliptical lamp 110 is depicted in a partial cutaway view. The reflective iris 210 comprises a generally spherical convex mirror portion 211 for retro-reflecting a high cone angle portion of a focused light beam back through the elliptical lamp 110, when the generally spherical convex mirror portion 211 is generally axially aligned with the elliptical lamp 110 along the longitudinal axis 115, and a center FS of the generally spherical convex mirror portion 211 is generally aligned with the focal point F2. The high cone angle portion then emerges from the elliptical lamp at a smaller cone angle after retroflection, as depicted in FIG. 4 and described in detail below. The reflective iris 210 further comprises an optical aperture 213 through said generally spherical convex mirror portion 211, disposed around a longitudinal axis of the generally spherical convex mirror portion 211, for enabling transmission there-through of a lower cone angle portion of the focused light beam and the retro-reflected high cone angle portion, such that an effective cone angle of the elliptical lamp is smaller than the given cone angle.

The reflective iris 210 further comprises an inner side 212 opposite the generally spherical convex mirror portion 211. While the generally spherical convex mirror portion 211 is both generally reflective and generally spherical, the properties of the inner side 212 are generally non-limiting as long as the inner side 212 does not interfere with the reflection of the focused light beam back through the elliptical lamp 110, and the transmission of the lower cone angle portion of the focused light beam and the retro-reflected high cone angle portion through the optical aperture 213. Indeed while the reflective iris 210 is generally depicted a shell of a spherical portion in FIG. 2 and subsequent figures, in other embodiments, the reflective iris 210 may be a solid spherical portion with the optical aperture 213 being a shape suitable for enabling transmission there-through of the lower cone angle portion of the focused light beam and the retro-reflected high cone angle portion.

While the optical aperture 213 is depicted as circular, the shape of the optical aperture 213 is not particularly limiting. Indeed, the shape of the optical aperture 213 may depend on the application. For example, if the elliptical lamp 110 and the reflective iris 210 are to be used in a projector with a rectangular integrator, the optical aperture 213 may be rectangular, and of the same aspect ratio as the integrator and/or the light modulator.

Moreover, while the reflective iris 210 is also depicted as generally circular, the shape of the reflective iris 210 is generally limited only by the shape of the elliptical lamp 110. For example, if the elliptical reflector 112 is not generally circular, but has been designed to provide generally elliptical areas that intersect at an angle to form a unified body, the generally spherical convex mirror portion 211 may reflect the shape of the resulting elliptical lamp, being comprised of generally convex mirror sections that intersect at an angle to form a unified generally spherical reflecting surface.

Figure 3:
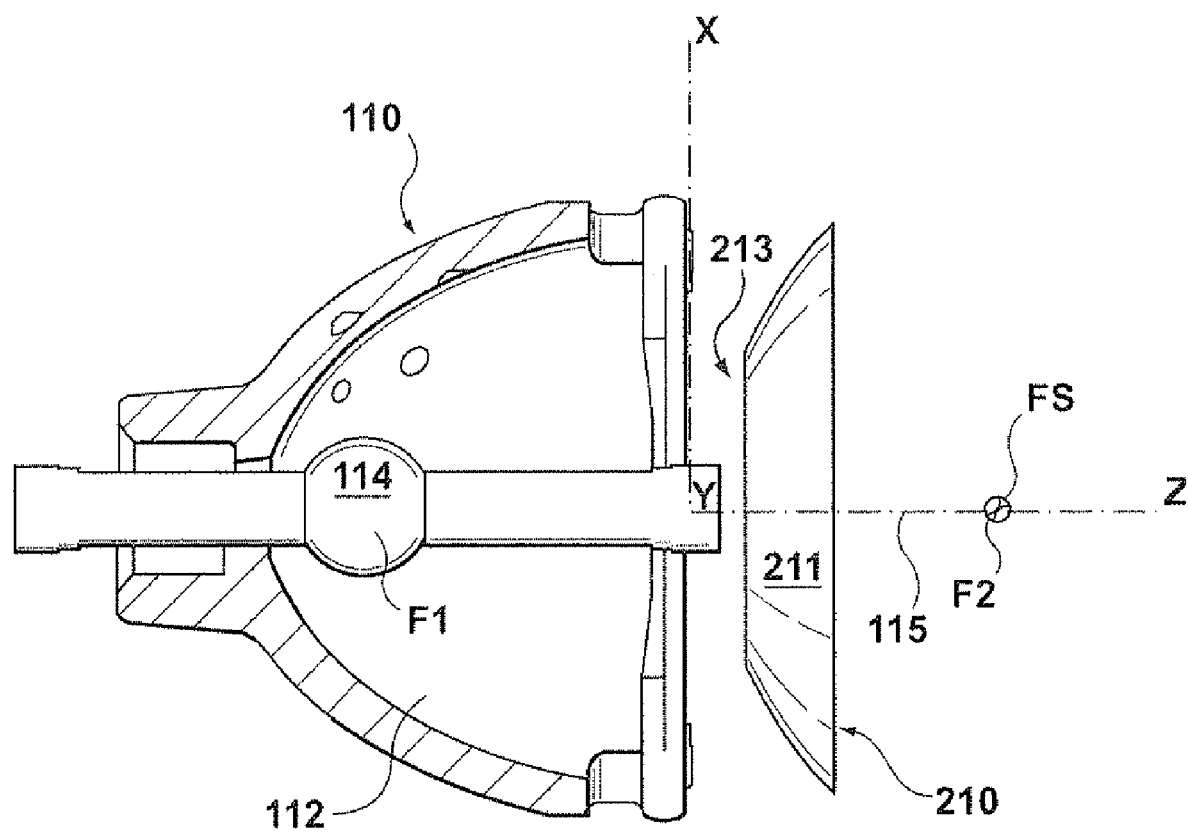
FIG. 3 depicts a side view of a reflective iris in alignment with an elliptical lamp, according to a non-limiting embodiment.

FIG. 3 depicts a side view of the elliptical lamp 110 and the reflective iris 210 in general alignment, with the elliptical lamp 110 depicted in cross-section, according to a non-limiting embodiment.

FIG. 4 depicts a schematic of the reflective iris 210 and the elliptical lamp 110 in general alignment, with the elliptical lamp 110 depicted in cross-section, according to a non-limiting embodiment, as in FIG. 1, with like numbers depicting like elements. The generally spherical convex mirror portion 211 is depicted schematically, while the optical aperture 213 is depicted in cross-section. The optical aperture 213 is further depicted having a diameter of Do, with Do being less than the diameter D of the aperture of the elliptical reflector 112. FIG. 4 further depicts the integrator 125 in axial alignment with both the reflective iris 211 and the elliptical lamp 110.

FIG. 4 further depicts the light ray 150a impinging on the generally spherical convex mirror portion 211. Due to the spherical nature of the generally spherical convex mirror portion 211, and the general axial alignment of the elliptical reflector 112 and the reflective iris 210, the light ray 150a impinges on the generally spherical convex mirror portion 211 generally normally (i.e. generally at a right angle). Hence a reflected light ray 460 travels directly back along the same path as the light ray 150a, passing generally back through the light source 114 to again reflect from the elliptical reflector 112. However, as the light ray 460 is now travelling at an angle which is 180° to the light ray 150a, when it again reflects from the elliptical reflector 112, the light ray 460 emerges from the elliptical lamp 110 at a smaller cone angle than light ray 150b. Hence, the light ray 460 passes through the optical aperture 213 and enters the integrator 125 at the smaller cone angle.

In contrast, the light ray 150b passes through the optical aperture 213 after being reflected from the elliptical reflector 112. As depicted, the light ray 150b comprises the largest angle light ray emitted from the elliptical lamp 110 that is not reflected by the generally spherical convex mirror portion 211. Light rays which emerge from the elliptical lamp 110 having a cone angle greater than that of the light ray 150b, are retro-reflected back through the elliptical reflector 112 by the generally spherical convex mirror portion 211. The overall result is that, when the reflective iris 210 is generally axially aligned with the elliptical lamp 110, and the center FS of the reflective iris 210 is generally aligned with the second focal point F2, the F-number of the elliptical lamp 110 is effectively adjusted from F2/D to FS/Do, with the specific F-number being defined by the diameter Do and the center FS of the reflective iris 210.

Hence, the reflective iris 210 may be enabled for effectively adjusting the F-number of the elliptical lamp 110 to a different F-number for better compatibility with the integrator 125, the illumination relay optics and/or the light modulator of a projector system, increasing the overall light collection efficiency of the system, by choosing a suitable diameter Do and a suitable center FS of the reflective iris 210.

The reflective iris 210 is generally comprised of a suitable material or combination of materials to enable the retroflection as described and is generally heat resistant: when the reflective iris 210 is aligned with the elliptical lamp 110, the reflective iris 210 is in proximity to the elliptical lamp 110 which can get hot in operation (for example an elliptical Hg lamp). Hence, the reflective iris 210 is comprised of a material, or combination of materials, which can withstand the heat of the elliptical lamp 110, and further the generally spherical convex mirror portion 211 is comprised of a suitable generally reflective material, or combination of materials for reflecting light emitted from the elliptical lamp 110.

In some non-limiting embodiments, the reflective iris 210 may comprise a suitable metal of a suitable shape, with the generally spherical convex mirror portion 211 being generally reflective of light emitted from the elliptical lamp 110. For example, the reflective iris 210 may comprises aluminum, with the generally spherical convex mirror portion 211 being polished, treated and/or coated to reflect light emitted from the elliptical lamp 110. In these embodiments, the optical aperture 213 may comprise an opening in the metal.

In another non-limiting embodiment, the reflective iris 210 may comprise a substrate material of a suitable shape, while the generally spherical convex mirror portion 211 may comprise a coating on the substrate material. In a non-limiting example, the substrate material may comprise a suitable transparent material, for example a high temperature glass (e.g., Vycor™, Pyrex™, N-BK7, fused silica and the like), of a suitable shape, and the generally spherical convex mirror portion 211 may comprise a suitable generally reflective coating on the glass, such as a thin film metal or a dielectric coating. Further, in some embodiments, if the glass is itself a generally spherical portion, the coating may be on the outside of the glass or on the inside of the glass (i.e. deposited on the inner side 212). In some of these embodiments, the optical aperture 213 may comprise an opening in the substrate material. In embodiments where the reflective iris 210 is comprised of a suitable transparent material and the generally spherical convex mirror portion 211 comprises a suitable generally reflective coating, the optical aperture 213 may comprise an opening in the generally reflective coating (i.e. an area of the reflective iris 210 that was not coated with the generally reflective coating). In these embodiments, the suitably transparent material may further comprise an optical filter for filtering unwanted light, for example UV light and/or infrared light. The optical filter may comprise an optical coating on the suitable transparent material, on any suitable side or area. Alternatively, the suitable transparent material may comprise inherent light filtering properties (e.g. a glass which absorbs UV light).

The outer dimensions of the reflective iris 210 are generally configured so that the reflective iris 210 retro-reflects light rays emitted from the elliptical lamp 110 that have the highest angle cone, for example the light ray 150a. Further, the outer dimensions of the reflective iris 210 are generally configured so as to not interfere with the impingement of the light that is transmitted through the optical aperture 213 on the integrator 125.

It will be recalled that the reflective iris 210 may be enabled for effectively adjusting the F-number of the elliptical lamp 110 to a specific F-number for better compatibility with the integrator 125, the illumination relay optics and/or the light modulator of a projector, to increase the overall light collection efficiency of the system. Moreover, the F-number of the elliptical lamp 110 can be effectively and freely adjusted by choosing a suitable Do of the optical aperture 213 for each application, and a suitable center FS. In addition, since the cone angle of the focused light beam that enters the integrator 125 is narrower (i.e. due to the larger F-number) with the reflective iris 210 in alignment (i.e. in FIG. 4 vs. FIG. 1), the contrast ratio of a projector using the reflective iris 210 will improve due to reduced light overlapping between an on-state and off-state light path from the light modulator (e.g. a Digital Micromirror Device or DMD).

In a non-limiting example, the F-number of the elliptical lamp 110 may be adjusted to match the input F-number of the illumination relay optics. In particular non-limiting embodiment, the input F-number is 1.3 and the F-number of the elliptical lamp 110 is 0.8. Hence, the reflective iris 210 may be configured to effectively adjust the F-number of the elliptical lamp 110 to 1.3 by choosing a suitable Do and a suitable center FS. By doing this, the light throughput increases resulting in a higher brightness of the projector. As well, the use of the reflective iris 210 improves the use of an input F-number for the illumination relay optics that is intermediate the elliptical lamp 110 and the light modulator, as the light collection efficiency at the integrator 125 is increased.

In order to demonstrate the performance of the reflective iris 110, two non-limiting models were created. FIG. 5 depicts a ray diagram of a model of the system depicted in FIG. 1, with the elliptical lamp 110 in alignment with a rectangular aperture 510 representing the entrance 126 of integrator 125, but without the reflective iris 210. FIG. 6 depicts a ray diagram of a model of the system depicted in FIG. 4, similar to that of FIG. 5 but with the reflective iris 210. In each figure, the light source 114 of FIGS. 1 and 4 is modeled as an areal light source rather than as a point light source.

In each model, the F-number of the elliptical lamp 110 is 0.8, while the rectangular aperture 510 has dimensions of 6.8×5.85 mm with a collection F-number of 1.3, and is located at the second focus F2 of the elliptical lamp 10. In FIG. 6, the diameter Do of the optical aperture 213 is 24 mm.

FIG. 5 further depicts a focused cone of light 520 as it emerges from the elliptical lamp 110, and a cone of light 530 that emerges from the rectangular aperture 510, as the focused cone of light 520 impinges on the rectangular aperture 510. In contrast, FIG. 6 also depicts the focused cone of light 520 as it emerges from the elliptical lamp 110, but FIG. 6 further depicts that with the reflective iris 210 in alignment, a high cone angle portion of the focused cone of light 520 is retro-reflected back through the elliptical lamp 110 and through the reflective iris 210. The result is that a focused cone of light 620 that emerges from the reflective iris 210 (in combination with the elliptical lamp 110) has a smaller cone angle than the focused cone of light 520 that emerges from the elliptical lamp 110. As the focused cone of light 620 impinges on the rectangular aperture 510, a cone of light 630 that emerges from the rectangular aperture 510, has a smaller cone angle than the cone of light 530 that emerges from the rectangular aperture 510 in the system of FIG. 5.

Table 1 further records the gain in light collection efficiency between the system depicted in FIG. 6 and the system depicted in FIG. 5 using ray-tracing illumination software such as TracePro from Lambda Research Corporation, 25 Porter Rd, Littleton, Mass. 01460-1434, USA. Light emitted from the elliptical lamp 110 was modeled as 21928 lumens. Light emitted through the rectangular aperture 510 without the reflective iris 110 in alignment (as in FIG. 5) was then determined to be 12937 lumens, while light emitted through the rectangular aperture 510 with the reflective iris 210 in alignment (as in FIG. 6) was determined to be 13957 lumens. In other words, with the reflective iris 210 in alignment, as in FIG. 6, an increase in light collection efficiency of 8% was achieved.

TABLE 1

| Total from Lamp = 21928 lm | | | |
|---|---|---|---|
| | With Iris (lm) | Without Iris (lm) | Improvement |
| Light through Rectangular Aperture | 13957 | 12937 | 8% |
| Light Collection Efficiency | (63.7%) | (59.0%) | |

Figure 7:
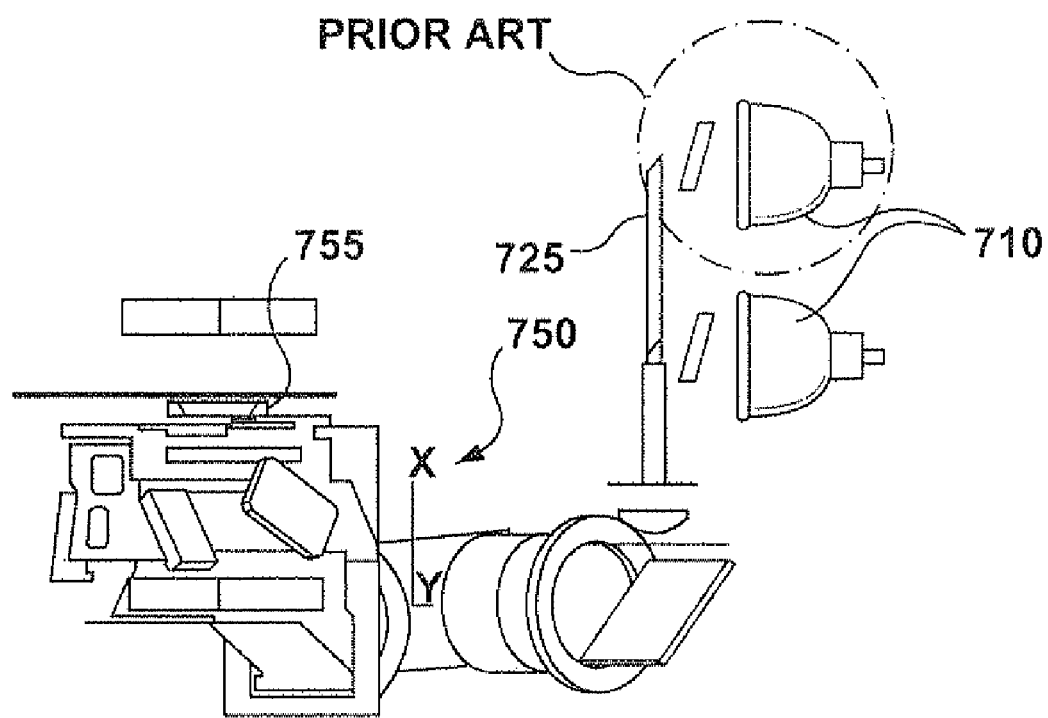
FIG. 7 depicts a projector, according to the prior art.
Figure 8:
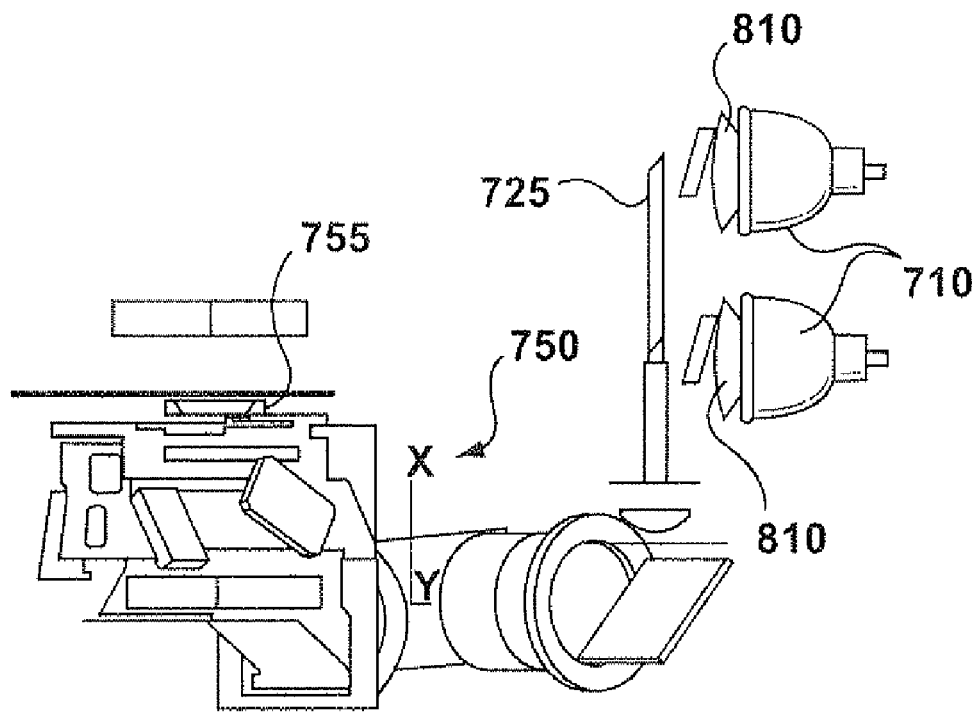
FIG. 8 depicts a projector, according to a non-limiting embodiment.

FIG. 7 depicts a schematic of a light collection system of a projector comprising two elliptical lamps 710, similar to the elliptical lamp 110, focused on two entrances of an integrator rod 725 which performs substantially the same function in substantially the same way as the integrator rod 125. The integrator 725 channels light from each of the elliptical lamps 710 perpendicular to the light output path of each of the elliptical lamps 710 to illumination relay optics 750, which subsequently magnifies and channels the light to a light modulator 755. In contrast, FIG. 8 shows how reflective irises 810, similar to the reflective iris 210, can be incorporated into the system of FIG. 7 to improve the light collection efficiency of the projector.

Figure 9:
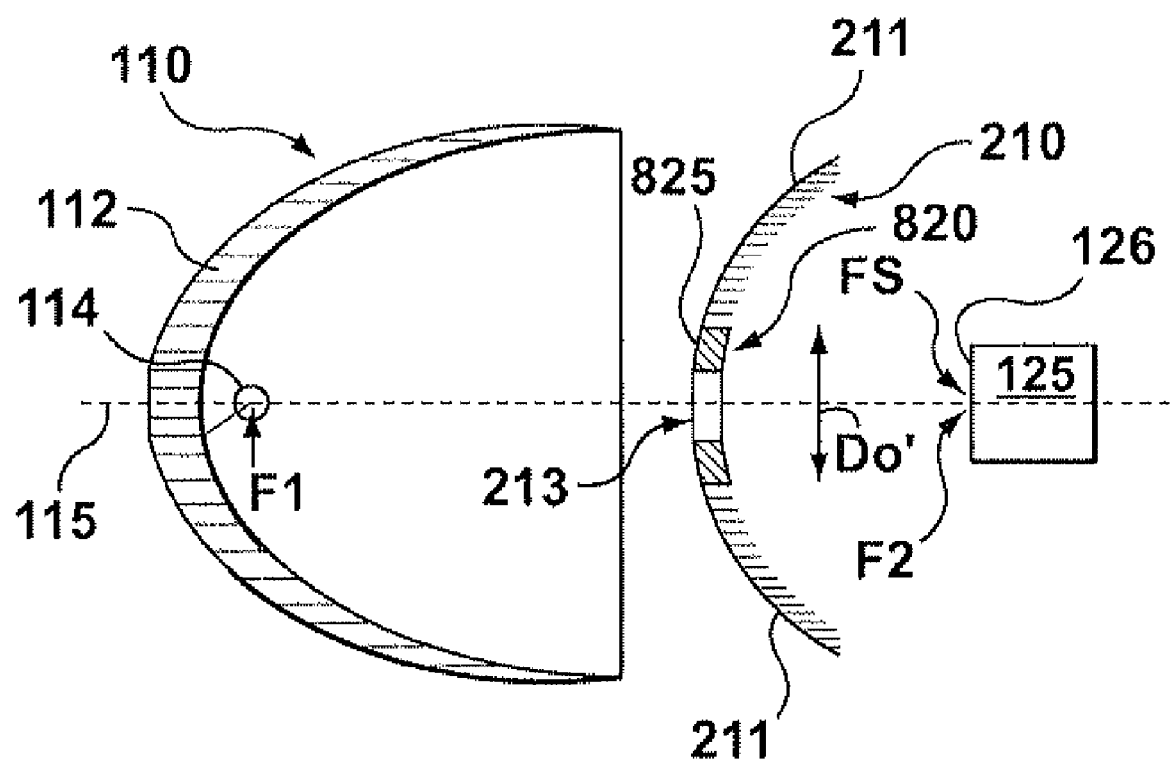
FIG. 9 depicts a cross-section of a reflective iris having a variable optical aperture, in alignment with an elliptical lamp, according to a non-limiting embodiment.

Attention is now directed to FIG. 9 is substantially similar to FIG. 4, with like elements depicted with like numbers, however the light rays 150 have been omitted for simplicity. FIG. 9 depicts another non-limiting embodiment of the reflective iris 210, in which the reflective iris 210 further comprises an apparatus 820 for varying the diameter of the optical aperture 213. Hence, in this embodiment, the optical aperture 213 has a variable diameter Do'. In some embodiments the apparatus 820 resides within the optical aperture 213 (as depicted). In other embodiments, the apparatus 820 may be mounted on the lamp side of the reflective iris 210, while in yet other embodiments, the apparatus 820 may be mounted on the integrator side of the reflective iris 210. In yet other embodiments, the apparatus 820 may be a separate element from the reflective iris 210 and be mounted either between the reflective iris 210 and the integrator 125, or between the reflective iris 210 and the elliptical lamp 110.

In some embodiments, the apparatus 820 is a generally spherical portion (as depicted), with a radius and center that is generally similar to the radius and center FS, respectively, of the reflective iris 210. In some of these embodiments, an elliptical lamp side surface 825 is generally reflective and retro-reflects light back towards the elliptical lamp 110 in a manner similar to the generally spherical convex mirror portion 211.

In other embodiments, the apparatus 820 may be generally planar.

In some embodiments, the apparatus 820 may also generally comprise a device for a user of the system of FIG. 8 to adjust the variable diameter Do'. In some embodiments, a lamp-facing surface of the apparatus 820 is reflective. In some non-limiting embodiments, the apparatus 820 comprises an iris diaphragm. In some of these embodiments, the iris diaphragm is a generally spherical portion.

By varying the variable diameter Do' of the optical aperture 213, the F-number of the system of FIG. 8, may be varied according to F=F2/Do'. Hence, a smaller Do' aperture will lead to a larger F-number. This has the effect of tightening the cone angle of the light impinging on the entrance 126, which results in a better contrast ratio for the optical components towards which the integrator 125 channels the light toward, such as a light modulator (e.g. a DMD).

In one non-limiting example, the systems of FIGS. 2, 3, 4, 6 and 9 comprise light production systems for an optical projector. In some of these embodiments, the optical projector comprises an analog optical projector, while in other embodiments, the optical projector comprises a digital optical projector, for example a digital optical projector as manufactured by Christie Digital Systems Canada, Inc., 809 Wellington St. N., Kitchener, Ontario, Canada N2G 4Y7.

In some embodiments the reflective iris 210 may be adapted for mounting between the elliptical lamp 110 and the integrator 125. In other embodiments, the reflective iris 210 may be adapted for mounting to the elliptical lamp 110, for example by gluing the reflective iris 640 to the aperture of the elliptical lamp 110 In some of these embodiments, a suitable spacer may be provided to protect the reflective iris 210 from the heat of the elliptical lamp 110, and to ensure a suitable optical path of the light rays 150.

Figure 10:
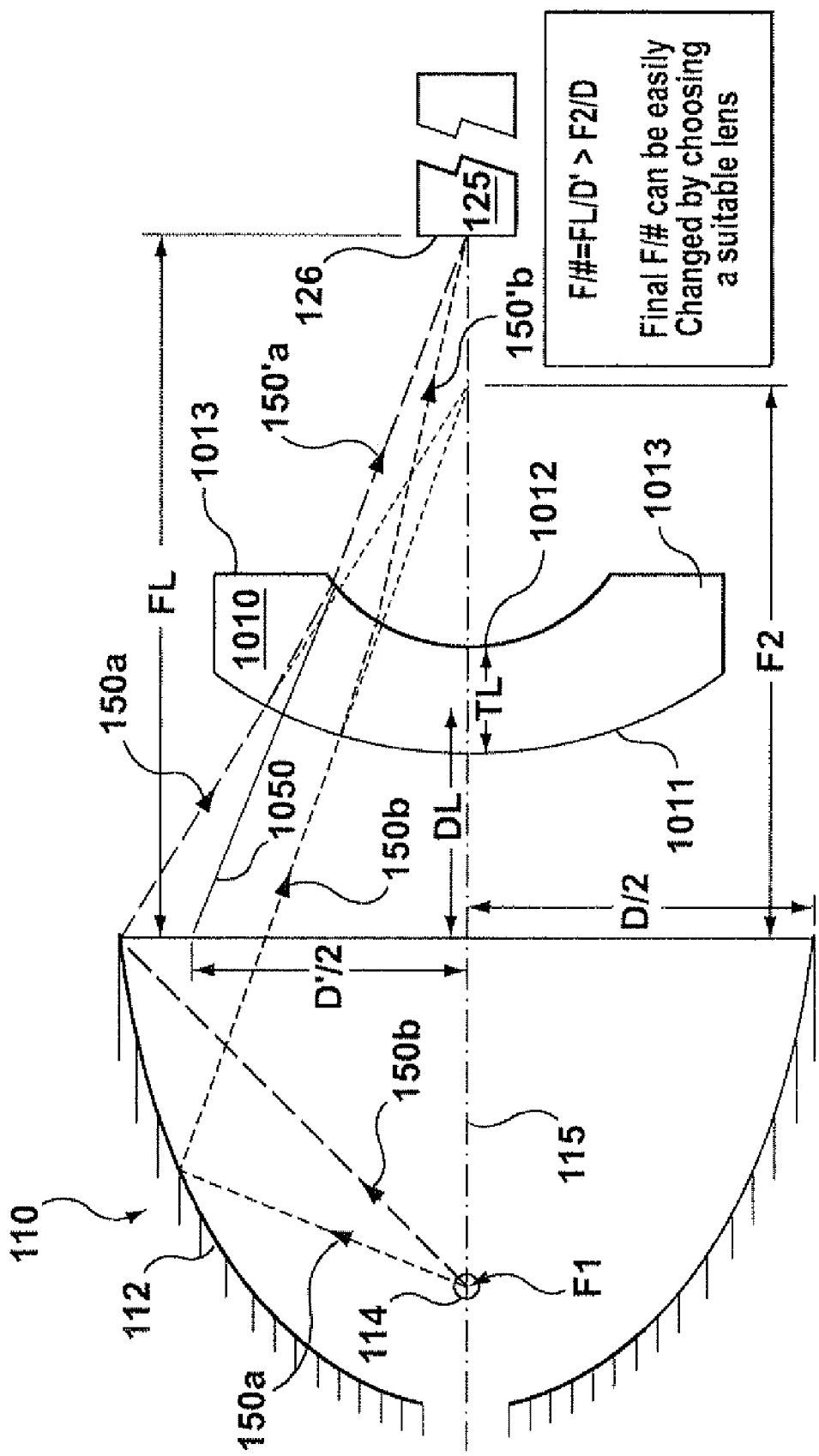
FIG. 10 depicts a cross section of a lens for effectively adjusting the F-number of an elliptical lamp, in alignment with the elliptical lamp, according to a non-limiting embodiment.

Turning now to FIG. 10, an alternative embodiment of an optical device for adjusting the F-number of an elliptical lamp is depicted. FIG. 10 depicts the elliptical lamp 110 and the integrator of FIG. 1 in schematic, along with light rays 150, with like elements depicted with like numbers. FIG. 10 further depicts an F-Number Lens (FNL) 1010 recovering the loss of a high-angle portion of the focused light beam emerging from the elliptical lamp 110. In essence, when the FNL 1010 is axially aligned with the elliptical lamp 1010, with an elliptical lamp side surface 1011 facing the elliptical lamp 110, the FNL 110 refracts, diverges and focuses the focused light beam emerging from the elliptical lamp 110 onto the entrance 126 of the integrator. Hence, the F-number of the elliptical lamp 110 can effectively be adjusted (e.g., from 0.8 to 1.3, as above) to match the input F-number of an illumination relay system in a projector. By doing this, the light collection efficiency will be increased which will result in a higher brightness of the projector.

The FNL 1010 generally comprises a meniscus or concave comprising a lamp side surface 1011 having a radius of curvature R1, and an integrator side surface 1012 having a radius of curvature R2. In the depicted embodiment, R2 is less than R1, and hence the FNL 1010 further comprises corners 1013 to connect the lamp side surface 1011 and the integrator side surface 1012. However, present embodiments are not particularly limited by the corners 1013 and the lamp side surface 1011 and the integrator side surface 1012 may be connected by any suitable structure. Moreoever the FNL 1010 has a thickness TL.

Further, a reference point on the FNL 1010 is located at a position DL relative to the aperture of the elliptical lamp 110. In some embodiments the reference point on the FNL 1010 is located at the center of the FNL 1010 (as depicted), however the reference point may be located at any suitable point on the FNL 1010, for example on the lamp side surface 1011 or the integrator side surface 1012.

The FNL 1010 may comprise any suitable optical material or combination of materials. In general the FNL 1010 should be enabled to tolerate the heat generated from the elliptical lamp 110. Non-limiting examples of suitable optical materials include but are not limited to fused silica, N-BK7, Vycor™, and Pyrex™. In some embodiments, for higher light transmission, N-BK7 may be used as long as the design of the system allows the N-BK7 to tolerate the heat generated from the elliptical lamp 110. In some embodiments, the surface of the lens side surface 1011 may be coated with a UV coating to block transmission of UV light from through the FNL 1010. This obviates the need for a separate UV filter in the system. In some embodiments, the surface of the integrator side surface 1012 and/or the surface of the lamp side surface 1011, can be coated with multi-layer anti-reflection coating to increase transmission through the FNL 1010.

Indeed, given the F-number of the elliptical lamp 110, and the desired effective F-number of the elliptical lamp, the relationships between the behavior of the system of FIG. 10 and parameters such as DL, TL, R1, R2, may be determined using optical design software such as ZEMAX® (from ZEMAX Development Corporation, 3001 112th Avenue NE, Suite 202, Bellevue, Wash. 98004-8017 USA), CODE V® (from Optical Research Associates, 3280 East Foothill Boulevard, Suite 300 Pasadena, Calif. 91107-3103), OSLO® (from Lambda Research Corporation, 25 Porter Rd, Littleton, Mass. 01460-1434 USA), and the like. Using such optical design software, DL, R1 and R2 and TL of the FNL 1010 may be determined, using as inputs the F-number of the elliptical lamp 110 and the desired effective F-number of the elliptical lamp 110 with the FNL 1010 in alignment with the elliptical lamp 110, as well as the distance between the entrance 126 and the elliptical lamp 110. Further, limits can be placed on some or all of the parameters. DL, for example, may be limited to a minimum distance that the FNL 1010 should be from the elliptical lamp 110 to prevent heat damage. Further DL, TL, R1 and R2 may be limited to reflect space considerations in the system. For example, there may be a preferred maximum distance between the entrance 126 and the FNL 1010 and or a preferred maximum distance between the entrance 126 and the elliptical lamp 110. With such inputs, the optical software may freely design the system depicted in FIG. 10. The FNL 1010 can then be manufactured as required.

In some embodiments, R1 of the lamp side surface 1011 is generally chosen so that the focused beam of light that emerges from the elliptical lamp 110 impinges on the lamp side surface 1011 at a normal or near normal angle, as depicted, such that the refraction of the focused light beam generally occurs at the integrator side surface 1012.

Further examination of FIG. 10 shows that, in the depicted embodiment, the entrance 126 is not located at the second focal point F2 of the elliptical lamp 110. Rather, the entrance is located at the focal point of the FNL 1010, which is depicted as a distance FL from the elliptical lamp 110. From the point of view of the entrance 126, the distance FL is the effective focal length of the elliptical lamp 110. Note that in FIG. 10, the second focal length F2 is represented as the distance F2 from the elliptical lamp 110 along the longitudinal axis 115.

Furthermore, FIG. 10 depicts the light ray 150a and the light ray 150b from FIG. 1. As in FIG. 1, the light ray 150b represents a low cone angle light ray while the light ray 150a represents the highest cone angle light ray that emerges from the elliptical lamp 110. In this embodiment, however, each light ray is refracted, diverged and focused by the FNL 110. Indeed, FIG. 10 depicts two paths for each light ray 150, the path of the light ray 150 in the absence of the FNL 1010

(broken line) and the path of the light ray 150a in the presence of the FNL 1010 (solid line). For example, in the absence of the FNL 1010, each light ray 150 would be focused onto the second focal point F2 (at the intersection of broken lines, as depicted). In the presence of the FNL 1010, a refracted portion of each light ray 150 is focused onto the entrance 126, at the distance FL from the elliptical lamp 110. The light ray 150a comprises a refracted portion 150'a, and the light ray 150b a refracted portion 150'b.

Figure 13:
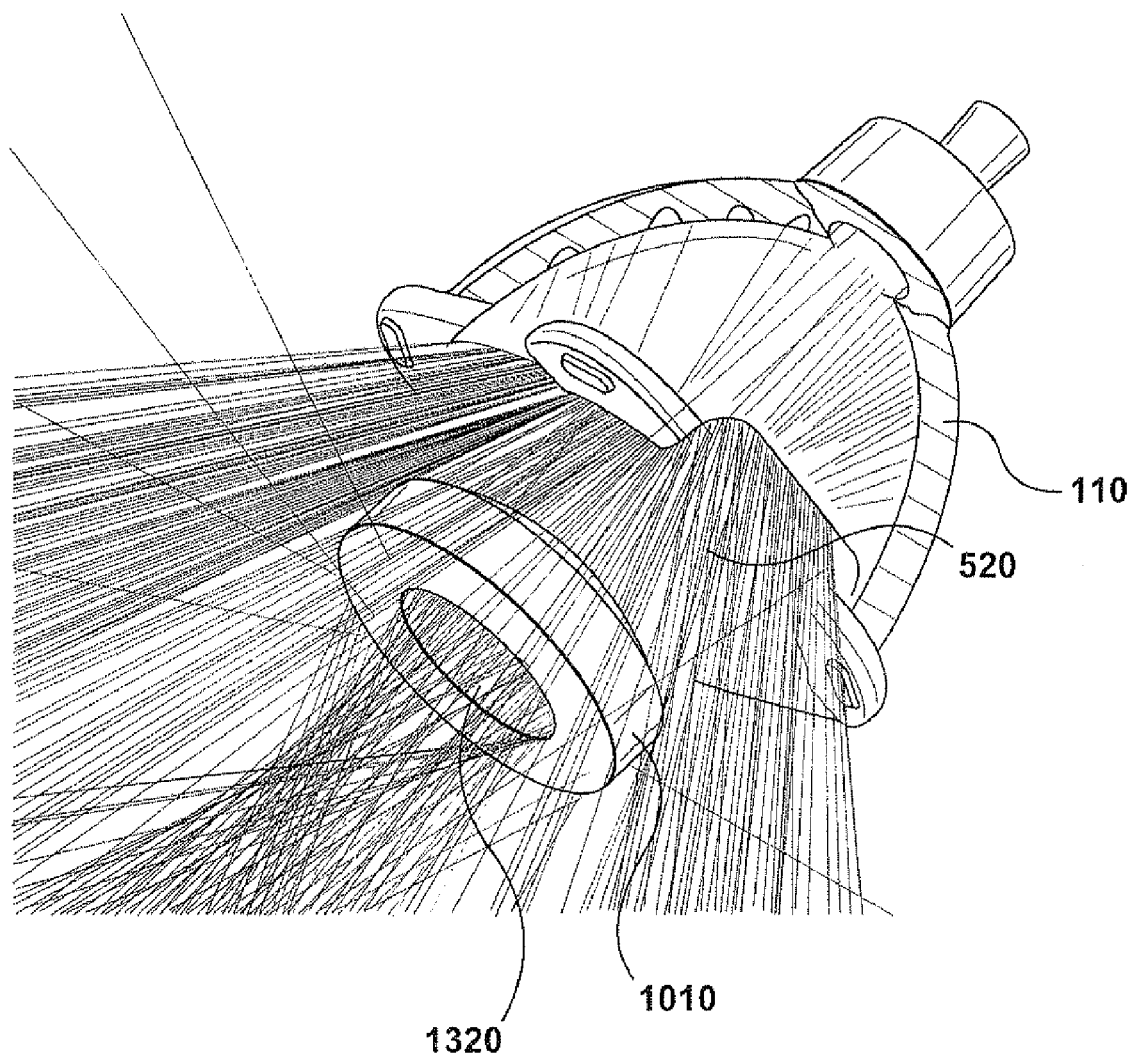
FIG. 13 depicts a ray trace diagram of light emitted from a lens for effectively adjusting the F-number of an elliptical lamp, in alignment with an elliptical lamp, according to a non-limiting embodiment.

The refracted portion 150'a represents the highest cone angle light ray emerging from the FNL 1010, as the light ray 150a represent the highest cone angle light ray impinging on the lamp side surface 1011 of the FNL 1010. Furthermore, it is understood that the refracted portion 150'a generally defines a high angle cone which is emerging from the FNL 1010 and which is generally symmetric about the longitudinal axis 115 (as depicted in FIG. 13). However, if a path 1050 of the refracted portion 150'a is directly traced back towards the elliptical lamp 110, the intersection of the path 1050 and the aperture of the elliptical lamp 110 defines a distance D'/2 from the longitudinal axis 115. Again turning to the point of view of the entrance 126 the cone defined by the refracted portion 150'a effectively appears to emerge from the elliptical lamp 110, but the aperture of the elliptical lamp 110 effectively appears to have a diameter D', rather than D. Hence, the effective F-number of the elliptical lamp 110/FNL 110 system is FL/D'.

Hence, the FNL 1010 may be enabled for effectively adjusting the F-number of the elliptical lamp 110 from F2/D to FL/D' for better compatibility with the integrator 125, the illumination relay optics and/or the light modulator in a projector system, increasing the overall light collection efficiency of the system. Moreover, the F-number of the elliptical lamp 110 can be effectively and freely adjusted by choosing a suitable FNL, similar to the FNL 1010, for each application. In addition, since the cone angle of the focused light beam that enters the integrator 125 is narrower (i.e. due to the larger F-number) with the FNL 1010 in alignment (i.e. in FIG. 4 vs. FIG. 1), the contrast ratio of a projector using the FNL 1010 will improve due to reduced light overlapping between an on-state and off-state light path from the light modulator (e.g. a Digital Micromirror Device or DMD).

In a non-limiting example, the F-number of the elliptical lamp 110 may be adjusted to match the input F-number of the illumination relay optics. In particular non-limiting embodiment, the input F-number is 1.3 and the F-number of the elliptical lamp 110 is 0.8. Hence, the FNL 1010 may be configured to effectively adjust the F-number of the elliptical lamp 110 to 1.3 by choosing a suitable R1, R2 and a suitable FL. By doing this, the light throughput increases resulting in a higher brightness of the projector. As well, the use of the FNL 1010 improves the use of an input F-number for the illumination relay optics that is intermediate the elliptical lamp 110 and the light modulator, as the light collection efficiency at the integrator 125 is increased.

Figure 11:
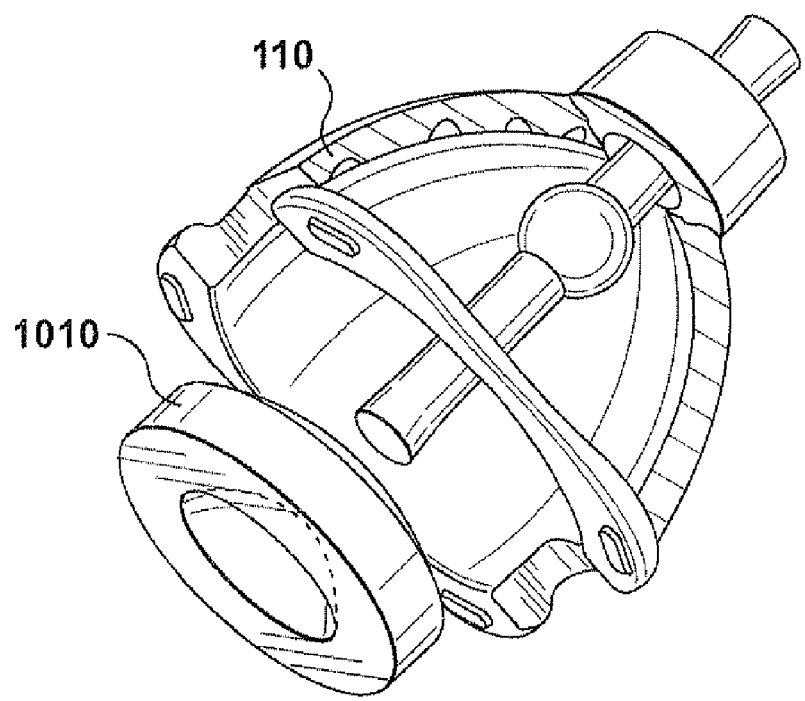
FIG. 11 depicts a perspective view of a lens for effectively adjusting the F-number of an elliptical lamp, in alignment with an elliptical lamp, according to a non-limiting embodiment.

Attention is now directed to FIG. 11, which depicts a perspective view of the FNL 1010 and the elliptical lamp in general alignment, according to a non-limiting embodiment. In FIG. 11, the elliptical lamp 110 is depicted in a partial cutaway view.

Figure 12:
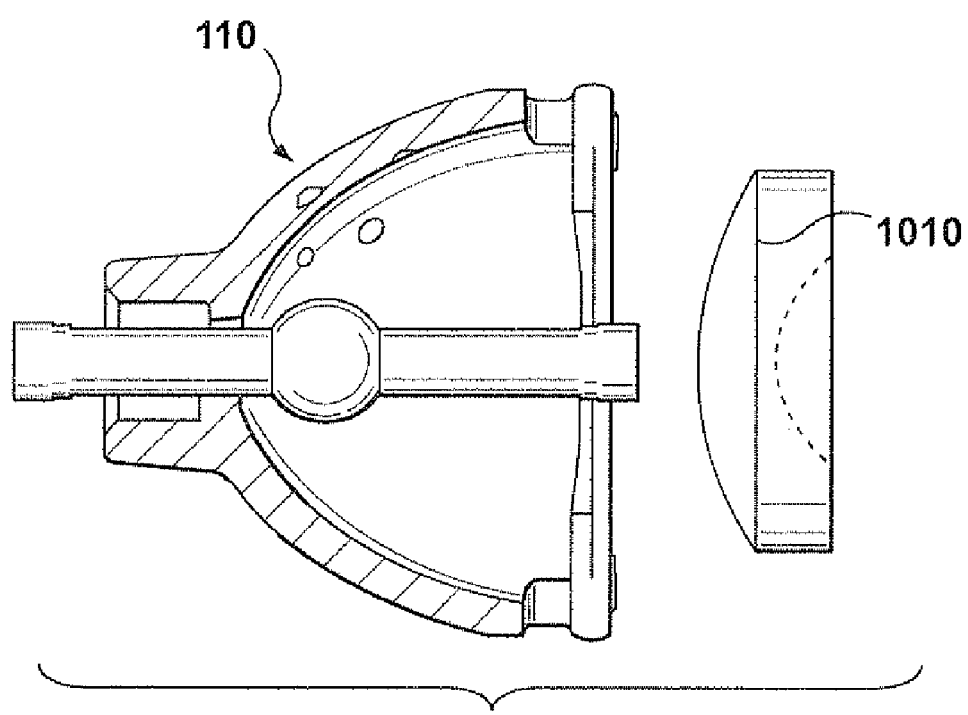
FIG. 12 depicts a side view of a lens for effectively adjusting the F-number of an elliptical lamp, in alignment with an elliptical lamp, according to a non-limiting embodiment.

FIG. 12 depicts a perspective side view of the FNL 1010 and the elliptical lamp 110 in general alignment, with the elliptical lamp 110 depicted in cross-section, according to a non-limiting embodiment.

In order to demonstrate the performance of the FNL 1010, two non-limiting models are created. The first model is similar to the model depicted in FIG. 5, with the elliptical lamp 110 in alignment with the rectangular aperture 510 representing the entrance 126 of integrator 125, but without the FNL 1010. However in this model, a UV filter is placed in front of the elliptical lamp 110 in order to reject UV from the elliptical lamp 110. FIG. 13 depicts a perspective view of a ray diagram of the elliptical lamp 110 in alignment with the FNL 1010. The second model is similar to FIG. 13, with the rectangular aperture 510 at the focal point. Compared to the first model, the FNL 1010 replaces the UV filter in each model, the light source 114 (e.g., as in FIGS. 1 and 10) is modeled as an areal light source rather than as a point light source.

In each model, the F-number of the elliptical lamp 110 is 0.8, while the rectangular aperture 510 has dimensions of 6.8×5.85 mm with a collection F-number of 1.3. In the each model, the rectangular aperture 510 is located at the appropriate focal position, and is representative of the entrance 126 of the integrator 125.

FIG. 13 further depicts the focused cone of light 520 as it emerges from the elliptical lamp 110, and a focused cone of light 1320 that emerges from the FNL 1010 (in combination with the elliptical lamp 110). The focused cone of light 1320 has a smaller cone angle than the focused cone of light 520 that emerges from the elliptical lamp 110.

In one non-limiting example, the systems of FIGS. 10-13 comprise light production systems for an optical projector. In some of these embodiments, the optical projector comprises an analog optical projector, while in other embodiments, the optical projector comprises a digital optical projector, for example a digital optical projector as manufactured by Christie Digital Systems Canada, Inc., 809 Wellington St. N., Kitchener, Ontario, Canada N2G 4Y7.

Figure 14:
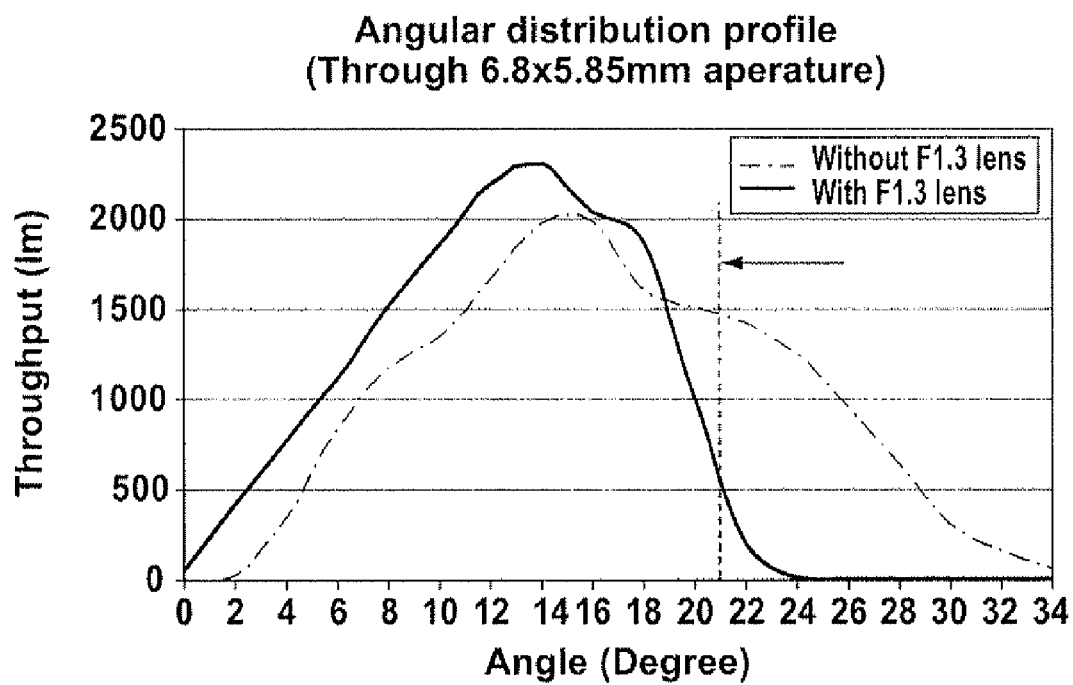
FIG. 14 depicts light distribution of light from an elliptical lamp shining through a rectangular aperture, as a function of angle, with and without a lens for effectively adjusting the F-number of an elliptical lamp, in alignment with an elliptical lamp, according to a non-limiting embodiment.
Figure 15:
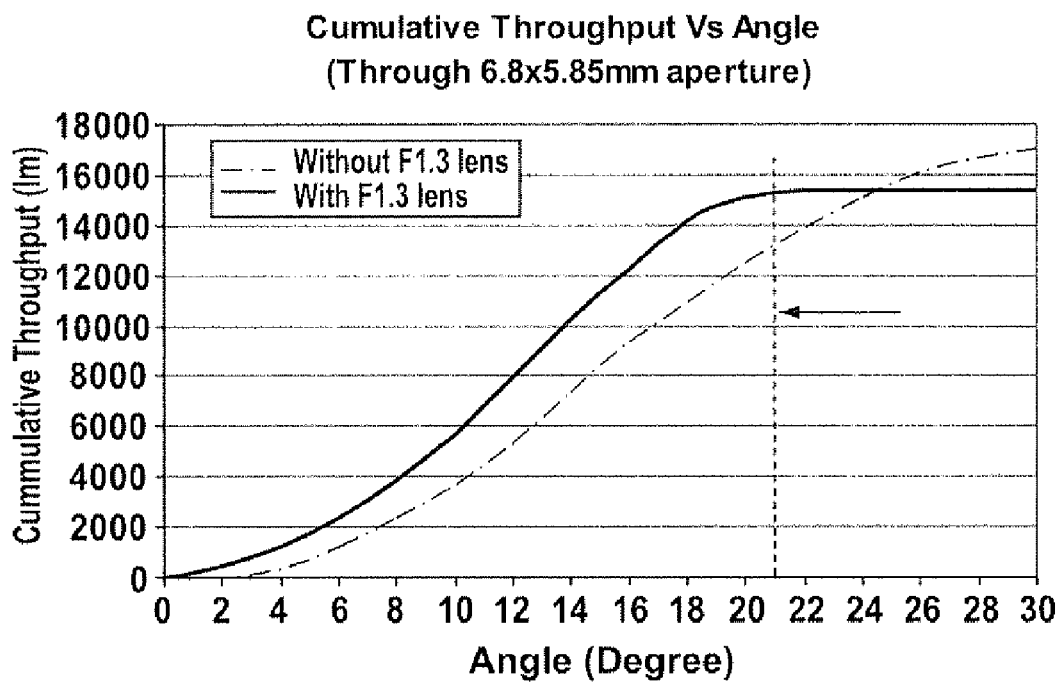
FIG. 15 depicts cumulative throughput of light from an elliptical lamp shining through a rectangular aperture, as a function of angle, with and without a lens for effectively adjusting the F-number of an elliptical lamp, in alignment with an elliptical lamp, according to a non-limiting embodiment.

FIG. 14 depicts the light distributions as a function of angle through the rectangular aperture 510 for both models. With the FNL 1010 in alignment with the elliptical lamp 110, the light distribution shifts to a lower angle as compared to the elliptical lamp 110 alone. Hence, means more light will be collected in an illumination relay system with an input F number of 1.3. FIG. 15 depicts the cumulative throughput of both models as a function of angle (i.e. an integration of the curves of FIG. 14). With the FNL 1010 in alignment with the elliptical lamp 110, the effective half angle of the elliptical lamp 110 is adjusted to approximately 210 from a half angle of grater than 30° without the FNL 1010. Hence the cone angle of the light emerging from the elliptical lamp 110 is adjusted from a higher cone angle (>30°) to a lower cone angle (~21°), demonstrating that the F-number of the elliptical lamp 110 has been adjusted from a lower F-number (0.8) to a higher F-number (1.3).

Table 2 further records the gain in light collection efficiency between the models (i.e. without the FNL 1010 in alignment with the elliptical lamp 110 and with the FNL 1010 in alignment with the elliptical lamp 110) using ray-tracing illumination software such as TracePro from Lambda Research Corporation, 25 Porter Rd, Littleton, Mass. 01460-1434, USA. Light emitted from the elliptical lamp 110 was modeled as 21251 lumens. Light emitted through the rectangular aperture 510 without the FNL 1010 in alignment was then determined to be 12460 lumens, while light emitted through the rectangular aperture 510 with the FNL 1010 in alignment was determined to be 15140 lumens. In other words, with the FNL 1010 in alignment, as in FIGS. 10-13, an increase in light collection efficiency of 21.5% was achieved.

TABLE 2

Total from Lamp = 21251 lm

|  | With FNL (lm) | Without FNL (lm) | Improvement |
|---|---|---|---|
| Light through Rectangular Aperture | 15140 | 12460 | 21.5% |
| Light Collection Efficiency | (71.2%) | (58.6%) | |

In addition, to the higher light collection efficiency, the contrast ratio of the projector can be enhanced. FIG. 14, further shows that the peak of the light emitted from the elliptical lamp 110 shifts from 15° to 13° when the FNL 1010 is in alignment. Hence, more light is now at lower cone angles and minimizes the amount of light overlapping between the on-state and off-state light inside the projector.

Figure 16:
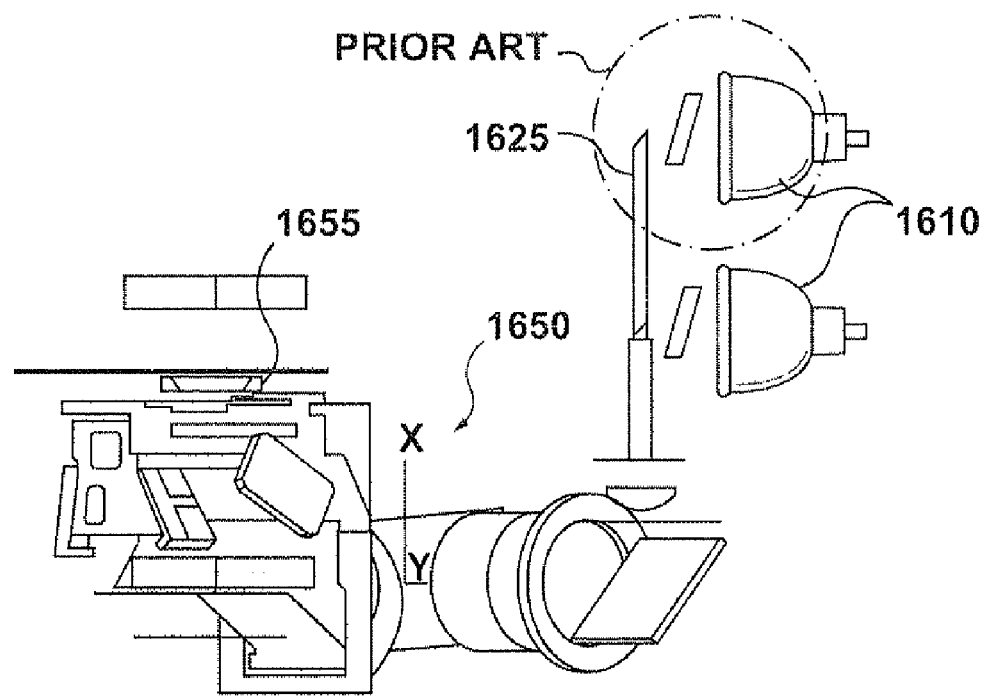
FIG. 16 depicts a projector, according to the prior art.
Figure 17:
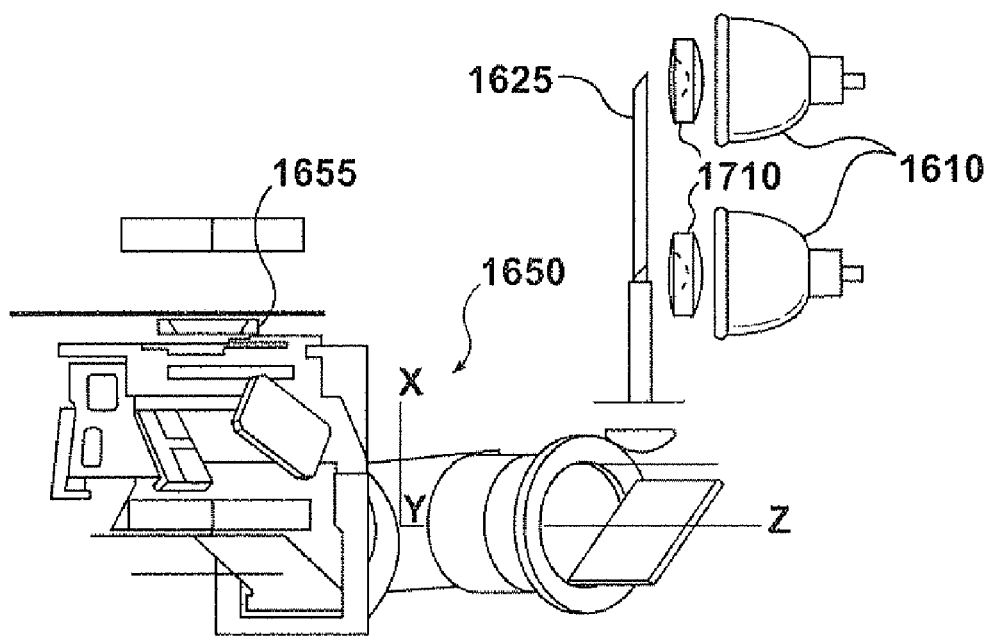
FIG. 17 depicts a projector, according to a non-limiting embodiment.

FIG. 16 depicts a schematic of a light collection system of a projector comprising two elliptical lamps 1610, similar to the elliptical lamp 110, focused on two entrances of an integrator rod 1625 which performs substantially the same function in substantially the same way as the integrator rod 125. The integrator 1625 channels light from each of the elliptical lamps 1610 perpendicular to the light output path of each of the elliptical lamps 1610 to illumination relay optics 1650, which subsequently magnifies and channels the light to a light modulator 1655. In contrast, FIG. 17 shows how two FNLs 1710, similar to the FNL 1010 210, can be incorporated into the system of FIG. 16 to improve the light collection efficiency of the projector. In modeling each system, it was found that the dual-lamp projector of FIG. 16 can only achieve 7739 lm. In contrast, when the FNLs 1710 are used to effectively adjust the F-number of the elliptical lamps 1610 to 1.3, as in FIG. 17, the total screen throughput now becomes 9482 lm, 22.5% brighter than before.

In one non-limiting example, the systems of FIGS. 10-13 comprise a light production system for an optical projector. In some of these embodiments, the optical projector comprises an analog optical projector, while in other embodiments, the optical projector comprises a digital optical projector, for example a digital optical projector as manufactured by Christie Digital Systems Canada, Inc., 809 Wellington St. N., Kitchener, Ontario, Canada N2G 4Y7.

In some embodiments the FNL 1010 may be adapted for mounting between the elliptical lamp 110 and the integrator 125. In other embodiments, the FNL 1010 may be adapted for mounting to the elliptical lamp 110, for example by gluing the FNL 1010 to the aperture of the elliptical lamp 110 In some of these embodiments, a suitable spacer may be provided to protect the FNL 1010 from the heat of the elliptical lamp 110, and to ensure a suitable optical path of the light rays 150.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

I claim:

1. A reflective iris for adjusting the F-number of an elliptical lamp, the elliptical lamp for producing a focused light beam at a given focal point having a given cone angle, the reflective iris comprising, a generally spherical convex mirror portion for retro-reflecting a high cone angle portion of the focused light beam back through the elliptical lamp, when the generally spherical convex mirror portion is in general longitudinal alignment with a light emitting aperture of the elliptical lamp and a center of the generally spherical convex mirror portion is generally aligned with the given focal point, such that said high cone angle portion emerges from the elliptical lamp at a smaller cone angle after retroflection; and an optical aperture through said generally spherical convex mirror portion, disposed around a longitudinal axis of said generally spherical convex mirror portion, for enabling transmission there-through of a lower cone angle portion of the focused light beam and the retro-reflected high cone angle portion, such that an effective cone angle of the elliptical lamp is smaller than the given cone angle.

2. The reflective iris of claim 1, wherein said effective cone angle comprises said lower cone angle.

3. The reflective iris of claim 1, wherein an area of said optical aperture is generally circular.

4. The reflective iris of claim 1, further comprising an adjustable aperture apparatus for adjusting an area of said optical aperture.

5. The reflective iris of claim 4, wherein said adjustable aperture apparatus comprises an iris diaphragm.

6. The reflective iris of claim 1, further comprising an ultraviolet filter for preventing ultraviolet light from passing through said optical aperture.

7. The reflective iris of claim 1, wherein the shape of said generally spherical convex mirror portion is generally circular, having a diameter that enables interaction of said generally spherical convex mirror portion with the highest angle light ray of said high cone angle portion of the focused light beam.

8. The reflective iris of claim 1, further comprising a body, said body comprising at least one spherical surface, wherein said generally spherical convex mirror portion resides at said at least one planar surface.

9. The reflective iris of claim 8, said body further comprising a bore through said longitudinal axis, said optical aperture comprising said bore.

10. The reflective iris of claim 8, wherein said body comprises a reflective metal.

11. The reflective iris of claim 8, further comprising a reflective film applied to said at least one spherical surface, and said generally spherical convex mirror portion comprises said reflective film.

12. The reflective iris of claim 8, wherein said body comprises a generally transparent material, said generally spherical convex mirror portion comprising a reflective film applied to a first area of said at least one spherical surface, and said reflecting film surrounding a second area of said at least one spherical surface free of said reflecting film, and said optical aperture comprising said second area.

13. The reflective iris of claim 12, said reflective film comprising at least one of a reflective metal film and an optical thin film structure.

14. The reflective iris of claim 12, wherein said generally transparent material comprises a high temperature glass.

15. The reflective iris of claim 14, wherein said high temperature glass comprises at least one of Vycor™ and Pyrex™.

16. The reflective iris of claim 8, wherein said body is at least one of mountable between said elliptical lamp and a lens, and mountable on said elliptical lamp.

17. An optical device for effectively adjusting the F-number of an elliptical lamp, the elliptical lamp for producing a focused light beam at a given focal point having a given cone angle, the optical device comprising:

a light interaction portion for optically interacting with the focused light beam when said light interaction portion is in general longitudinal alignment with a light emitting aperture of the elliptical lamp, said light interaction portion for triggering optical adjustment of a cone angle of at least a high cone angle portion of said focused light beam to a smaller cone angle;

a light egress portion, coupled to said light interaction portion, for enabling exit of the focused light beam from the optical device with an effective cone angle smaller than the given cone angle, after said cone angle of said at least said high cone angle portion of the focused light beam has been adjusted to said smaller cone angle; and a reflective iris, said light interaction portion comprising a generally spherical convex mirror portion of said reflective iris for retro-reflecting said high cone angle portion of the focused light beam back through the elliptical lamp, when the generally spherical convex mirror portion is in general longitudinal alignment with a light emitting aperture of the elliptical lamp and a center of the generally spherical convex mirror portion is generally aligned with the given focal point, such that said high cone angle portion emerges from the elliptical lamp at said smaller cone angle after retroflection; and said light egress portion comprises an optical aperture of said reflective iris through said generally spherical convex mirror portion, disposed around a longitudinal axis of said generally spherical convex mirror portion, for enabling transmission there-through of a lower cone angle portion of said focused light beam and the retro-reflected high cone angle portion, such that an effective cone angle of the elliptical lamp is smaller than the given cone angle.

18. An optical device for effectively adjusting the F-number of an elliptical lamp, the elliptical lamp for producing a focused light beam at a given focal point having a given cone angle, the optical device comprising:

a light interaction portion for optically interacting with the focused light beam when said light interaction portion is in general longitudinal alignment with a light emitting aperture of the elliptical lamp, said light interaction portion for triggering optical adjustment of a cone angle of at least a high cone angle portion of said focused light beam to a smaller cone angle;

a light egress portion, coupled to said light interaction portion, for enabling exit of the focused light beam from the optical device with an effective cone angle smaller than the given cone angle, after said cone angle of said at least said high cone angle portion of the focused light beam has been adjusted to said smaller cone angle; and a meniscus lens, said light interaction portion comprising s a lamp side surface of said meniscus lens, having a first radius of curvature, and said light egress portion comprising an integrator side surface of said meniscus lens, having a second radius of curvature smaller than said first radius of curvature, such that when said focused light beam enters said lamp side surface and exits said integrator side surface, the focused light beam is converged to a cone angle smaller than said given cone angle.

19. A light production system comprising: an elliptical lamp generically symmetrical about a longitudinal axis for producing a focused light beam, said elliptical lamp having a first F-number; and means for effectively adjusting said first F-number of said elliptical lamp to a second F-number, said means for effectively adjusting the first F-number of said elliptical lamp to a second F-number positioned in front of a light emitting aperture of said elliptical lamp, wherein said means for effectively adjusting said first F-number of said elliptical lamp to a second F-number comprises an optical device in longitudinal alignment with said light emitting aperture, said optical device for adjusting said first F-number of said elliptical lamp comprising:

a light interaction portion for optically interacting with said focused light beam, said light interaction portion for triggering optical adjustment of a cone angle of at least a high cone angle portion of said focused light beam to a smaller cone angle;

a light egress portion, coupled to said light interaction portion, for enabling exit of said focused light beam from said optical device with an effective cone angle smaller than the given cone angle, after said cone angle of said at least said high cone angle portion of the focused light beam has been adjusted to said smaller cone angle, such that an effective F-number of said elliptical lamp comprises said second F-number, said second F-number smaller than said first F-number; and a reflective iris, said light interaction portion comprising a generally spherical convex mirror portion of said reflective iris for retro-reflecting said high cone angle portion of the focused light beam back through the elliptical lamp, when the generally spherical convex mirror portion is in general longitudinal alignment with said light emitting aperture and a center of the generally spherical convex mirror portion is generally aligned with the given focal point, such that said high cone angle portion emerges from the elliptical lamp at said smaller cone angle after retroflection; and said light egress portion comprising an optical aperture of said reflective iris through said generally spherical convex mirror portion, disposed around a longitudinal axis of said generally spherical convex mirror portion, for enabling transmission there-through of a lower cone angle portion of said focused light beam and the retro-reflected high cone angle portion, such that an effective cone angle of the elliptical lamp is smaller than the given cone angle.

20. A light production system comprising:

an elliptical lamp generically symmetrical about a longitudinal axis for producing a focused light beam, said elliptical lamp having a first F-number; and means for effectively adjusting said first F-number of said elliptical lamp to a second F-number, said means for effectively adjusting the first F-number of said elliptical lamp to a second F-number positioned in front of a light emitting aperture of said elliptical lamp, wherein said means for effectively adjusting said first F-number of said elliptical lamp to a second F-number comprises an optical device in longitudinal alignment with said light emitting aperture, said optical device for adjusting said first F-number of said elliptical lamp comprising:

a light interaction portion for optically interacting with said focused light beam, said light interaction portion for triggering optical adjustment of a cone angle of at least a high cone angle portion of said focused light beam to a smaller cone angle;

a light egress portion, coupled to said light interaction portion, for enabling exit of said focused light beam from said optical device with an effective cone angle smaller than the given cone angle, after said cone angle of said at least said high cone angle portion of the focused light beam has been adjusted to said smaller cone angle, such that an effective F-number of said elliptical lamp comprises said second F-number, said second F-number smaller than said first F-number; and a meniscus lens, wherein said light interaction portion comprises a lamp side surface of a meniscus lens, having a first radius of curvature, and said light egress portion comprises an integrator side surface of the meniscus lens, having a second radius of curvature smaller than said first radius of curvature, such that when said focused light beam enters said lamp side surface and exits said integrator side surface, the focused light beam is converged to a cone angle smaller than said given cone angle.

21. A projector comprising:

a light production system comprising:

an elliptical lamp generically symmetrical about a longitudinal axis for producing a focused light beam, said elliptical lamp having a first F-number; and means for effectively adjusting said first F-number of said elliptical lamp to a second F-number, said means for effectively adjusting the first F-number of said elliptical lamp to a second F-number positioned in front of a light emitting aperture of said elliptical lamp, wherein said means for effectively adjusting said first F-number of said elliptical lamp to a second F-number comprises an optical device in longitudinal alignment with said light emitting aperture, said optical device for adjusting said first F-number of said elliptical lamp comprising:

a light interaction portion for optically interacting with said focused light beam, said light interaction portion for triggering optical adjustment of a cone angle of at least a high cone angle portion of said focused light beam to a smaller cone angle;

a light egress portion, coupled to said light interaction portion, for enabling exit of said focused light beam from said optical device with an effective cone angle smaller than the given cone angle, after said cone angle of said at least said high cone angle portion of the focused light beam has been adjusted to said smaller cone angle, such that an effective F-number of said elliptical lamp comprises said second F-number, said second F-number smaller than said first F-number; and one of a reflective iris, said light interaction portion comprising a generally spherical convex mirror portion of said reflective iris for retro-reflecting said high cone angle portion of the focused light beam back through the elliptical lamp, when the generally spherical convex mirror portion is in general longitudinal alignment with said light emitting aperture and a center of the generally spherical convex mirror portion is generally aligned with the given focal point, such that said high cone angle portion emerges from the elliptical lamp at said smaller cone angle after retroflection; and said light egress portion comprising an optical aperture of said reflective iris through said generally spherical convex mirror portion, disposed around a longitudinal axis of said generally spherical convex mirror portion, for enabling transmission there-through of a lower cone angle portion of said focused light beam and the retro-reflected high cone angle portion, such that an effective cone angle of the elliptical lamp is smaller than the given cone angle; or a meniscus lens, wherein said light interaction portion comprises a lamp side surface of a meniscus lens, having a first radius of curvature, and said light egress portion comprises an integrator side surface of the meniscus lens, having a second radius of curvature smaller than said first radius of curvature, such that when said focused light beam enters said lamp side surface and exits said integrator side surface, the focused light beam is converged to a cone angle smaller than said given cone angle;

an integrator, an entrance of said integrator generally located at, at least one of a center of said means for effectively adjusting said first F-number of said elliptical lamp to a second F-number and a focal point of said means for effectively adjusting said first F-number of said elliptical lamp to a second F-number;

an imaging component for accepting light from said integrator and causing said light from said integrator to be formed into an image, said integrator arranged to channel light to said imaging component; and at least one projection component for accepting said image from said imaging component and projecting said image.

* * * * *